(No Model.)

J. SPYER & R. S. INGALLS.
DENTAL PLATE.

No. 310,233. Patented Jan. 6, 1885.

WITNESSES:
Norris A. Clark
P. B. Turpin

INVENTORS.
Joseph Spyer
Robert S. Ingalls
By R. S. & A. P. Lacey
ATTY'S

UNITED STATES PATENT OFFICE.

JOSEPH SPYER AND ROBERT S. INGALLS, OF NEWTON, KANSAS.

DENTAL PLATE.

SPECIFICATION forming part of Letters Patent No. 310,233, dated January 6, 1885.

Application filed April 21, 1883. (No model.)

*To all whom it may concern:*

Be it known that we, JOSEPH SPYER and ROBERT S. INGALLS, citizens of the United States, residing at Newton, in the county of Harvey, in the State of Kansas, have invented a new, useful, and Improved Method of Inserting and Affixing Artificial Teeth in the Mouth; and we do hereby declare that the following is a full and exact description.

The nature of our invention consists in providing for the insertion of artificial teeth a base of rubber or other material, which, when adapted and applied to the natural gum, shall be sustained by atmospheric pressure—that is, by the attraction of cohesion—extending the whole length of the plate.

To enable others skilled in the art to make and use our invention, we here proceed to describe the construction and operation of the same, reference being had to the drawings herewith accompanying, making a part of this specification, in which—

Figure 1:
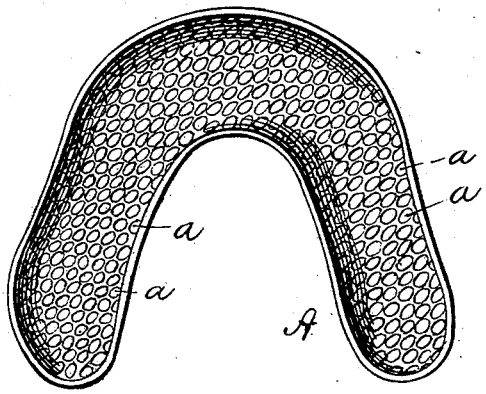
Figure 2:
Figure 3:
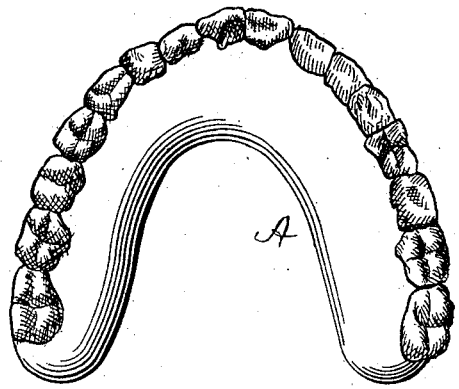

Figure 1 exhibits a plan view of the inner plate with raised shallow rounded impressions to be applied to the natural gums, and which forms suction or cohesion the entire length of the plate. Fig. 2 is a cross-section of one side of the plate, and Fig. 3 shows the outer plate or surface to which the teeth are attached.

We construct our base for the teeth of rubber or any of the known materials—gold, platinum, or other metal. We adjust the inner surface, as shown at Fig. 1, to the exact form of the natural gum, to constitute, when applied thereto in the mouth, atmospheric pressure the entire length of the plate, the surface of which is covered with shallow rounded impressions, thus combining suction without causing any irritation.

When the base is rubber or other material, it is convenient to model the set in wax and outline the exact size on the plaster cast. The width varies according to the absorption, and measures from nine to twelve millimeters. The firmness of this narrow plate in the mouth is attained by the inner surface of the plate, which is covered with small raised, rounded, continuous impressions, as shown at Fig. 1.

After the set is modeled in wax it is placed in the plaster flask, so that in separating the flask the teeth will remain in one half of the flask and the model in the other half. Then we melt out the wax and put in rubber. We then place on the surface of the half of the flask containing rubber a piece of soft metal or vegetable fabric correspondingly cut, and so constructed as to leave the impressions on the surface of the plate of shallow rounded impressions, as shown in Fig. 1. We then close the flask and vulcanize. After the plate is finished it will be covered with slightly-rounded impressions that aid its suction without producing any irritation of the membrane, and only covering the edge of the gum and a small strip turned over on the inner side. The suction-cavity, as shown at Fig. 1, is applicable to all bases used for artificial dentures made in any form.

In the accompanying drawings, A designates the plate; A', the inner surface thereof, and *a* the projections thereon. In use the rounded projections will be pressed into the flesh of the gum. Around the base of these projections there is practically a continuous channel or opening, so that the moment the edge of the plate is removed from the gum the entire surface of the latter is at the same instant relieved. By entering the flesh of the gums, as described, the projections expel the air from between the soft parts of the mouth, and such expulsion of the air causes the plate to hold firmly to its place, as will be understood.

What we claim as our invention, and desire to secure by Letters Patent, is—

A dental plate provided on its suction-face with a series of slightly-rounded or approximately semi-oval projections arranged in close proximity to each other and in such number as to practically cover the said suction-face, substantially as and for the purposes set forth.

JOSEPH SPYER.
ROBERT S. INGALLS.

Witnesses:
D. FELGAR,
JAMES DEXTER.